US012798398B2

(12) United States Patent
Alfieri et al.

(10) Patent No.: US 12,798,398 B2
(45) Date of Patent: Nov. 17, 2026

(54) CONTROL ARCHITECTURE OF A FUEL CELL PROPULSION SYSTEM

(71) Applicant: DUMAREY Automotive Italia S.p.A., Turin (IT)

(72) Inventors: Vincenzo Alfieri, Turin (IT); Giulio Binetti, Turin (IT); Edoardo Gandino, Turin (IT)

(73) Assignee: DUMAREY Automotive Italia S.p.A., Turin (IT)

( * ) Notice: Subject to any disclaimer, the term of this patent is extended or adjusted under 35 U.S.C. 154(b) by 46 days.

(21) Appl. No.: 19/114,739

(22) PCT Filed: Sep. 28, 2023

(86) PCT No.: PCT/IB2023/059691

§ 371 (c)(1),
(2) Date: Mar. 24, 2025

(87) PCT Pub. No.: WO2024/074947

PCT Pub. Date: Apr. 11, 2024

(65) Prior Publication Data

US 2026/0103089 A1 Apr. 16, 2026

(30) Foreign Application Priority Data

Oct. 3, 2022 (IT) ........................ 102022000020271

(51) Int. Cl.
*B60L 58/40* (2019.01)
*B60L 15/20* (2006.01)
*G05B 13/02* (2006.01)

(52) U.S. Cl.
CPC ........... *B60L 15/2045* (2013.01); *B60L 58/40* (2019.02); *G05B 13/027* (2013.01); (Continued)

(58) Field of Classification Search
CPC ...... B60W 20/10; B60W 20/11; B60W 20/15; B60W 20/13; B60W 20/14; Y02T 10/70; (Continued)

(56) References Cited

U.S. PATENT DOCUMENTS

2018/0134170 A1* 5/2018 Zhou ........................ B60L 58/21
2019/0001956 A1* 1/2019 Han ........................ B60W 10/06
2020/0007064 A1* 1/2020 Wang ........................ B60L 3/12

* cited by examiner

*Primary Examiner* — Kenneth J Malkowski
(74) *Attorney, Agent, or Firm* — R. Ruschena Patent Agent, LLC

(57) ABSTRACT

The present invention is related to a control architecture of a fuel cell propulsion system which exploits optimal predictive control unit and self-learning of the vehicle's behavior in real life. It is based on a model-based predictive control (MPC) algorithm which is a model-based control methodology to address constrained multi-variable control problems, exploiting a model to predict the future evolution of the system up to a predetermined time horizon. The control architecture optimization module is equipped with two optimizers coupled together to obtain a general optimization strategy of the fuel cell propulsion system. The two optimizers are characterized by two different dynamics, one slow and one fast, to manage subsystems with different dynamics as is the case of a fuel cell system slow dynamics) and a battery (fast dynamics).

8 Claims, 2 Drawing Sheets

(52) U.S. Cl.
CPC ....... *B60L 2240/12* (2013.01); *B60L 2240/14* (2013.01); *B60L 2240/622* (2013.01); *B60L 2240/642* (2013.01); *B60L 2240/645* (2013.01); *B60L 2240/68* (2013.01); *B60L 2250/18* (2013.01); *B60L 2260/42* (2013.01); *B60L 2260/50* (2013.01)

(58) Field of Classification Search
CPC ......... Y02T 10/62; Y02T 10/72; Y02T 90/40; B60L 15/2045; B60L 58/40; B60K 6/48; B60Y 2400/202
See application file for complete search history.

CONTROL ARCHITECTURE OF A FUEL CELL PROPULSION SYSTEM

RELATED APPLICATIONS

This is a national stage application of PCT application PCT/IB2023/059691 having an international filing Date of Sep. 28, 2023. This application claims foreign priority based on application 102022000020271 of Italy, filed on Oct. 3, 2022.

BACKGROUND OF THE INVENTION

1. Field of the Invention

The present invention is related to a control architecture of a fuel cell propulsion system, particularly to a control architecture of a fuel cell propulsion system as defined in the preamble of claim 1.

2. Brief Description of the Prior Art

A fuel cell propulsion system (for example, a propulsion system for vehicles and/or buses) is a complex system that must be controlled in real time by determining the distribution of power between fuel cells, battery and any recovery system of kinetic energy (or KERS, acronym for Kinetic Energy Recovery System, for example, a flywheel and/or a supercapacitor), each with a different response time, in order to satisfy the power demand of the electric motor (derived from the user's commands on the acceleration and brake pedals, or possibly from automatic driving systems (for example, Cruise Control) as well as the request for auxiliary electrical loads.

The critical point, from the user's point of view, is the optimal definition in real time of all the power set-points for each subsystem of the propulsion system: think, for example, to the fuel cells, the battery, the kinetic energy recovery system.

Real-time optimization of set-point values must take into account a predetermined cost function and the required performance metric, while satisfying all constraints at the subsystem and system level and considering the impacts of possible different uncertainties.

Uncertainties that are present when, for example, traffic, route and/or driving style are considered and which heavily impact the performance of the vehicle both in nominal conditions and in real driving.

There is therefore a need to define a control architecture of a fuel cell propulsion system that is free of the above-mentioned drawbacks.

SUMMARY OF THE INVENTION

To substantially resolve the technical problems highlighted above, an aim of the present invention is a control architecture, based on optimization and self-learning strategies (machine learning) capable of managing the trade-off between the needs of users who are in conflict with each other.

These conflicting needs can be, for example: minimizing hydrogen consumption, maximizing the life of components, avoiding power imbalances on electrical connections.

The control architecture, according to the present invention, exploits optimal predictive control and self-learning of the vehicle's behavior in real life.

The proposed strategy is based on a model-based predictive control (MPC) algorithm which is a model-based control methodology to address constrained multi-variable control problems, exploiting a model to predict the future evolution of the system up to a predetermined time horizon.

In particular, a control architecture optimization module is equipped with two optimizers coupled together to obtain a general optimization strategy of the fuel cell propulsion system. The two optimizers are characterized by two different dynamics, one slow and one fast, to manage subsystems with different dynamics as is the case of a fuel cell system (slow dynamics) and a battery (fast dynamics).

Indeed, the proposed strategy can effectively satisfy subsystem constraints (e.g., minimum and maximum allowed operating range, etc.) and system-level constraints (e.g., power balancing on electrical connections). It can also satisfy both memory and efficiency requirements to make the solution, with real-time constraints, integrable into a mass production controller.

Therefore, according to the present invention there is provided a control architecture of a fuel cell propulsion system having the characteristics set forth in the independent claim, annexed to the present description.

Further embodiments of the invention, preferred and/or particularly advantageous, are described according to the characteristics set forth in the attached dependent claims.

BRIEF DESCRIPTION OF THE DRAWINGS

The invention will now be described with reference to the attached drawings, which illustrate some non-limiting embodiments, in which.

DETAILED DESCRIPTION OF THE INVENTION

By way of purely illustrative and non-limiting example, the control architecture of a fuel cells propulsion system will now be described with reference to the aforementioned figures.

Figure 1:
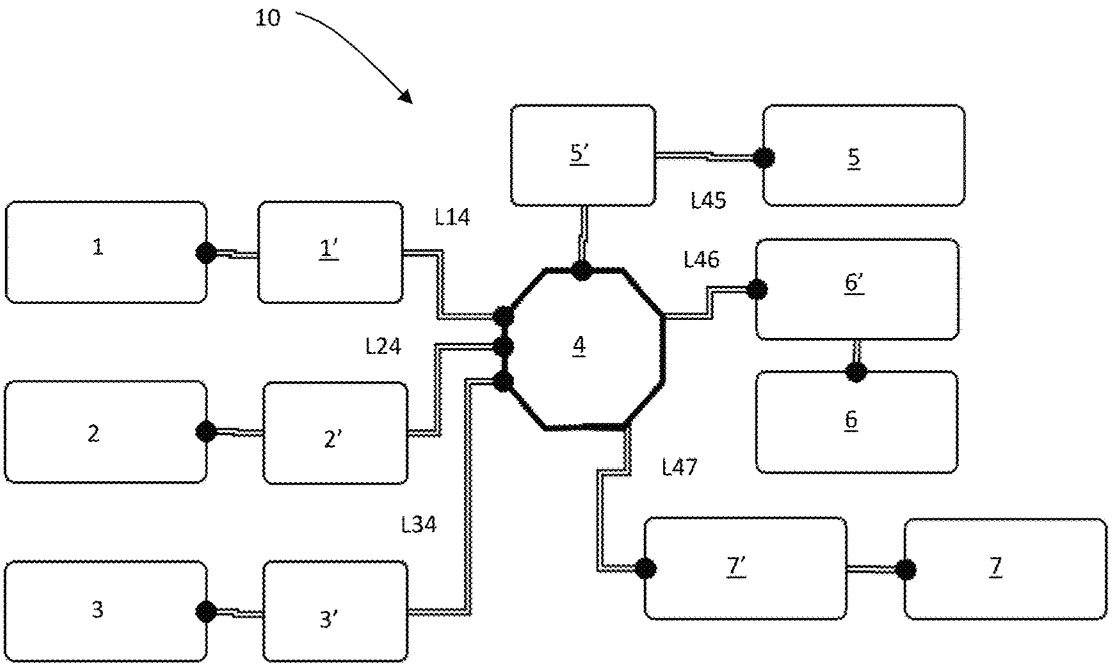
FIG. 1 is a diagram of a fuel cell propulsion system.

With particular reference to FIG. 1, a system for a fuel cells propulsion system is identified with reference 10.

By way of example, the fuel cell propulsion system 10, as regards the different sources of electrical energy, may include:

- a fuel cell system 1 equipped with at least one "stack" of fuel cells and related system components. As is known, the fuel cell system uses hydrogen and oxygen, and by means of an electrochemical reaction provides electricity (and water vapor as a waste product). The electrical energy output from the fuel cell system can possibly be connected to a first DC/DC converter 1'. The fuel cell system is a type of system known to experts in this technology and for this reason it will not be described further in detail, a battery 2 or a group of batteries, to supply or store electrical energy. The battery output (or battery group) can also be connected to a second DC/DC converter 2', a kinetic energy recovery system 3 (KERS, for example a flywheel and/or a super-capacitor). As is known, the KERS is an electromechanical device capable of recovering part of the kinetic energy of a vehicle during the braking phase and transforming it into energy (in the case illustrated, electrical), which can be used again for traction of the vehicle or for power supply of its electrical devices. The KERS output can also possibly be connected to a third DC/DC converter 3', a power distribution unit 4, equipped with input ports for the different sources of electrical energy and output ports for one or more electrical loads.

Furthermore, the fuel cell propulsion system 10, as regards electrical loads (electric propulsion means and users), may include, again by way of example:

at least one electric motor 5 (exactly one in the illustrated example) serving the propulsion of the vehicle and powered by an output port of the distribution unit 4 with inverter 5' placed between the distribution unit 4 and the electric motor 5 itself, high voltage electrical loads 6, for example at a voltage equal to 400 V, also powered by an output port of the distribution unit 4 with a converter 6' (for example a 700V/400V DC/DC converter) placed between the distribution unit 4 and the high voltage electrical loads 6, low voltage electrical loads 7, for example 24 V batteries, also powered by an output port of the distribution unit 4 with a converter 7' (for example a 700V/24V DC/DC converter) placed between the distribution unit 4 and low voltage electrical loads 7.

The plant connections are as follows:—the sources of electrical energy, fuel cell system 1, battery 2, kinetic energy recovery system 3 are all electrically connected to the input ports of the distribution unit 4, via corresponding lines L14, L24, L34, along which may contain any corresponding DC/DC converters 1', 2', 3';

the electrical loads, electric motor 5, high voltage electrical loads 6, low voltage electrical loads 7 are all electrically connected to the output ports of the distribution unit 4, via the corresponding lines L45, L46, L47, along which the inverter 5' and the DC/DC converters 6', 7' may be located respectively.

The present invention, taking as an example the fuel cell propulsion system 10, as described above, relates to a control architecture 100, implemented on an electronic control unit 200 and provided with online optimization and online self-learning strategies (machine learning) for optimal control of the system 10.

The electronic control unit 200 includes an optimization module 250 provided with two optimizers coupled together to obtain a general optimization strategy of the system 10. The two optimizers are characterized by two different dynamics, a slow one for the fuel cell system 1 and a fast one for the battery 2 and/or the kinetic energy recovery system 3. In particular:

the first optimizer is focused on the optimal control actions for the slow dynamics (i.e., that of the fuel cell plant 1 in the propulsion system 10), with a larger calculation step and a longer prediction time horizon;

the second optimizer focuses on fast dynamics, i.e., that of battery 2 and kinetic energy recovery system 3 (e.g., flywheel and/or super-capacitor), with a smaller calculation step and a time horizon of shorter prediction.

Therefore, an optimizer based on a "slow" predictive control (MPC) algorithm and an optimizer based on a "fast" predictive control (MPC) algorithm were designed to perform optimizations on different time scales, where the fast MPC exploits a slow MPC output as input for optimization.

A one-time optimization would require a shorter time frame (to properly control the fast dynamics) and a longer prediction horizon (to account for the slow dynamics), making a similar approach infeasible in a mass-production ECU, due to the high memory and high computing efforts required. The novelty of the proposed solution is an architecture capable of managing the different dynamics through two different optimizers coupled together. In this way, the memory and computational load required by the electronic control unit are reduced.

The general optimization strategy is based on stochastic models (i.e., models that have as input data not fixed values but probability values) of the uncertainties (e.g., traffic, route, driving style) that influence the performance of the vehicle in order to achieve optimal performance not only in nominal conditions, but also in real driving conditions. The overall system optimization strategy 10 is mainly aimed at reducing hydrogen consumption, increasing component life, improving vehicle performance (e.g., during critical maneuvers), satisfying component and system level constraints.

Self-learning strategies consist of:

short-term vehicle speed model self-learning strategy to exploit speed prediction with a predictive optimization approach. In this way, hydrogen consumption is reduced and the life of the components is increased in real life conditions (considering the driver's style, route and traffic);

self-learning strategy of the predictive controller parameters to adapt the behavior to the vehicle mission. By operating in this way, the performance of the vehicle in real life and also in critical maneuvers is improved.

In more detail, the first self-learning strategy is designed to provide a short-term power request from the driver to the vehicle, based on the following functions:

online self-learning of the speed or acceleration or power of a vehicle or any combination of these, capable of learning the behavior of the specific driver, traveling along different roads (urban, extra-urban, motorway), and the typical use of the specific vehicle, exploiting techniques such as statistical models and/or artificial neural networks and/or Markov chains and similar;

online self-learning of typical "mission segments", capable of learning typical characteristics of the mission profile, such as speed or acceleration limits on a given road specified, for example, by GPS coordinates;

online adaptation of the vehicle's speed or acceleration or power model to real-time traffic conditions, capable of adapting the learned model to the specific environment in terms of traffic on the current road.

A second self-learning strategy is designed to perform an online adaptation of the optimizer parameters, based on the following functions:

online identification of "road gradient segments" along the route, mainly flat, uphill, downhill;

online adaptation of the predictive controller parameters based, for example, on the different slope segments of the road, capable of learning the best predictive controller parameters, to maximize the performance of the vehicle uphill (where more power is required) and to maximize energy recovery on downhill.

Three preferred forms of implementation of the control architecture will be described below, which differ from each other based on the different types of paths.

Figure 2:
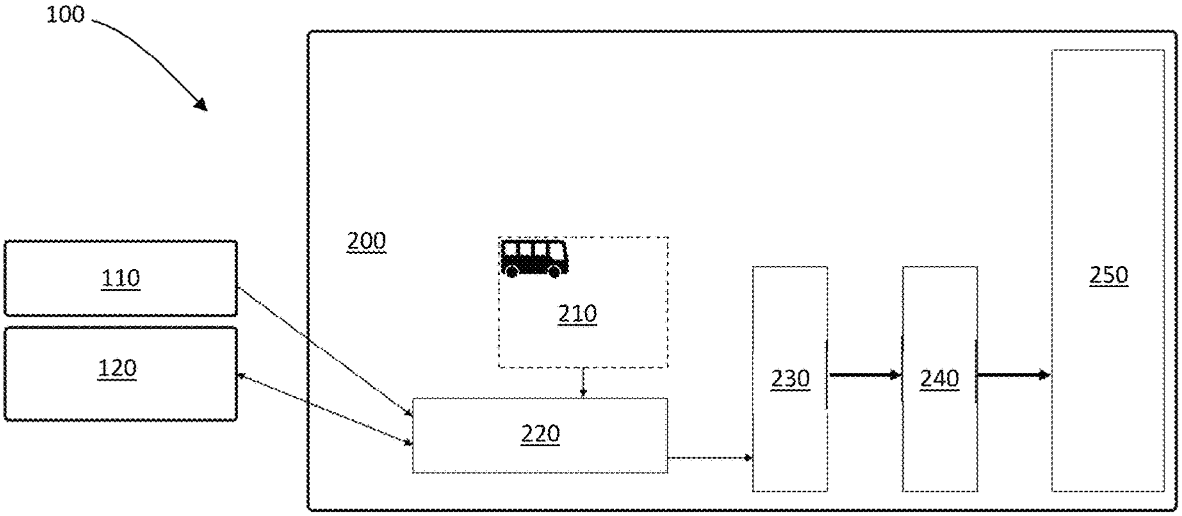
FIG. 2 is a logical diagram of a control architecture of the system of FIG. 1, according to a first and preferred embodiment of the present invention.

With reference to FIG. 2, the control architecture 100 according to a first embodiment of the invention includes available information 110, 120, 210 and an electronic control unit 200. In this embodiment, the control architecture 100 optimizes the system 10 in the case of a general route.

A first type of information 110 is available via web services on traffic and the available information sent to the vehicle can be, for example, the average speed along the route and the speed limits on the different sections of road.

A second type of information 120 is available to the vehicle as it is allocated to a cloud service, accessible to the electronic control unit 200. This information can include, for example:

- a model of the vehicle speed trend in an urban route,
- a model of the vehicle speed trend on an extra-urban route,
- a model of the vehicle speed trend on a motorway route.

The electronic control unit 200 will also be able to use information available on board the vehicle 210, such as, for example:

- the speed of the vehicle,
- the acceleration of the vehicle,
- geographical coordinates, i.e., latitude and longitude, available through global positioning systems (GPS),
- the slope of the road.

Obviously, this is information available and updated in real time.

The electronic control unit 200 is provided with a series of modules, each with different functions.

A self-learning module 220 will include real-time learning of a vehicle speed model in a stochastic manner. This model will be based on the information available and in particular on the type of route (urban, extra-urban, motorway).

Therefore, the model is acquired by a stochastic scenario generation module 230 which will have to predict the future speed of the vehicle in a short time, less than 10 seconds, for example for the next 2 seconds.

This stochastic scenario of the future speed of the vehicle is acquired by a calculation module 240 which will process the trend of the future speed to build a scenario of the power required by the vehicle. In other words, this calculation module 240 will model the vehicle to predict future power demand in the same short time, less than 10 seconds, for example for the next 2 seconds.

This latest model of the vehicle in terms of power required in the near future will be acquired by the optimization module 250. The optimization module is a predictive and stochastic control algorithm, provided, as mentioned, with two optimizers, one with slow dynamics, the more rapid dynamics, which determines the optimal distribution of power between the various energy sources—fuel cell system 1, battery 2, kinetic energy recovery system 3—maximizing performance in the different scenarios of future energy demand vehicle power.

Figure 3:
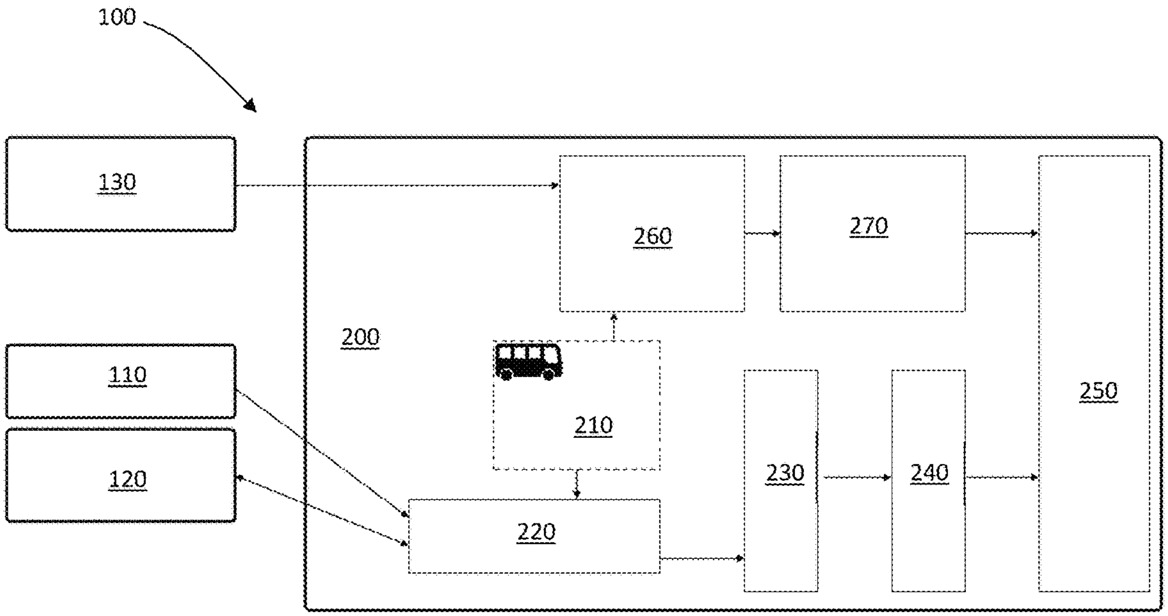
FIG. 3 is a logical diagram of a control architecture of the system of FIG. 1, in a second and preferred embodiment of the present invention.

With reference to FIG. 3, the control architecture 100 in a second embodiment of the invention includes available information 110, 120, 130, 210 and an electronic control unit 200. In this embodiment, the control architecture 100 optimizes system 10 in the case of a generic journey but with a planned and known route.

In this situation, in addition to the first type of information 110 and the second type of information 120, there is also a third type of information 130, linked to the programmed route and available via the vehicle's navigation system. The electronic control unit 200, or possibly a cloud service accessible to the electronic control unit 200, will therefore also be able to have this information available, for example, a sequence of GPS coordinates and the slope of the road in the different sections of the route.

Furthermore, the electronic control unit 200 also has a second calculation module 260, which may be available locally or even on the cloud and which determines road gradient segments along the route, i.e., flat, uphill, downhill. This calculation module 260 makes use of the third type of information 130 (peculiar to this embodiment of the invention) and the information 210 available on board the vehicle.

Finally, the electronic control unit 200 has a third calculation module 270 which, based on the information coming from the second calculation module 260, modifies the parameters of the predictive control algorithm of the optimization module 250 based on the type of road slope segment and to predefined rules which are, for example, those of changing the reference value of the state of charge (SOC) of the battery at the starting point of the uphill or downhill stretches, as the corresponding uphill or downhill stretch approaches.

The remaining modules of the electronic control unit 200 coincide with what has already been described in the first embodiment.

Figure 4:
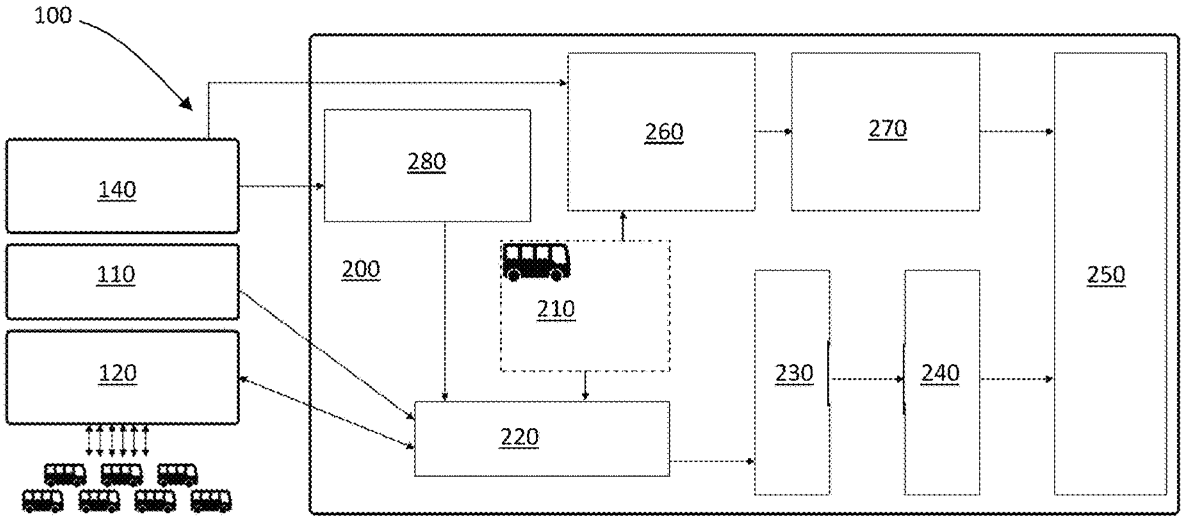
FIG. 4 is a logical diagram of a control architecture of the system of FIG. 1, according to a third and preferred embodiment of the present invention.

With reference to FIG. 4, the control architecture 100 according to a third embodiment of the invention includes available information 110, 120, 140, 210 and an electronic control unit 200. In this embodiment, the control architecture 100 optimizes system 10 in the case of a repetitive journey and, evidently, with a programmed and known route, for example the journey of an urban bus.

In this situation, in addition to the first type of information 110 and the second type of information 120, there is also a fourth type of information 140, available to the vehicle via the web service of the company that owns the vehicle itself (for example a municipal company for urban transport) or a different web service in which vehicle data is saved while carrying out missions. This fourth type of information 140 includes, for example, the scheduled mission stops (in terms of GPS coordinate sequence) and is used by the second calculation module 260, previously described.

Furthermore, the electronic control unit 200 also has a second self-learning module 280, which may be available locally or even on the cloud and which, based on the fourth type of information 140, learns the typical speeds on the "mission segments" and transmits them to the first self learning module 220.

The remaining modules of the electronic control unit 200 coincide with what has already been described in the second embodiment.

Ultimately, the control architecture according to the present invention is therefore capable of managing the different dynamics (slow and fast) of the propulsion subsystems through two different optimizations coupled together.

In addition to the form of the invention as described above, it must be understood that there are numerous other variants. It must also be understood that these forms of embodiment are merely illustrative and do not limit either the scope of the invention, its applications or its possible configurations. On the contrary, although the above description allows the skilled person to implement the present invention at least according to one exemplary form of embodiment thereof, it should be understood that many variations of the described components are possible, without thereby departing from the scope of the invention as defined in the appended claims, which are interpreted literally and/or according to their legal equivalents.

The invention claimed is:

1. A control architecture (100) of a fuel cell propulsion system (10) for a vehicle, the system comprising a fuel cell system (1), at least one battery (2), a kinetic energy recovery system (3), propulsion means (5), electrical users (6, 7) and a power distribution unit (4), equipped with inlet ports for electrical power sources and outlet ports for the propulsion means and the electrical users, the control architecture (100) comprising an electronic control unit (200), configured to acquire available information (110, 120, 130, 140, 210) and execute optimization strategies, the control architecture (100) being characterized by the fact that the electronic control unit (200) comprises an optimization module (250) provided with two optimizers coupled together to obtain a global optimization strategy of the system (10) in which a first optimizer is characterized by a slow dynamics with a large calculation step and a long prediction time horizon for the management of the fuel cell system (1) and a second optimizer is characterized, compared to the first optimizer, by faster dynamics with smaller calculation step and a shorter prediction time horizon for managing the at least one battery (2) and/or the kinetic energy recovery system (3).

2. The control architecture (100) according to claim 1, wherein the electronic control unit (200) comprises a self-learning module (220) configured for online learning of vehicle speed or acceleration or power, behavior of the vehicle driver, typical characteristics of the mission profile, traffic conditions in real time, exploiting statistical models and/or artificial neural networks and/or Markov chains.

3. The control architecture (100) according to claim 2, for the optimization of the system (10) in the event that the vehicle travels on a generic route, wherein the electronic control unit (200) also includes:

a module for generating stochastic scenarios (230) configured to acquire information (110, 120, 210) and predict according to a stochastic scenario the future speed of the vehicle in a timeframe smaller than 10 seconds, a calculation module (240) configured to acquire the future speed trend from the stochastic scenario generation module (230), elaborate a scenario of the power required by the vehicle in the same timeframe smaller than 10 seconds and transmit the scenario of the required power to the optimization module (250).

4. The control architecture (100) according to claim 3, wherein the information available to the self-learning module (220) comprises:

a first type of information (110) in turn comprising the average speed along the route and the speed limits on different sections of the route, a second type of information (120) in turn including models of the vehicle speed trend in an urban, suburban or motorway route, information available on board the vehicle (210) including the speed and acceleration of the vehicle, the geographical coordinates and the slope of the different sections of the route.

5. The control architecture (100) according to claim 4, for the optimization of the system (10) in the event that the vehicle travels on a generic but programmed and known route, wherein the electronic control unit (200) includes:

a second calculation module (260) configured to determine road slope sections along the route, based on additional available information (130) and information available on board the vehicle (210), and a third computation module (270) configured to acquire information from the second computation module (260) and modify parameters for a predictive control algorithm of the optimization module (250).

6. The control architecture (100) according to claim 5, wherein the additional available information comprises a third type of information (130) in turn comprising a sequence of GPS coordinates along the programmed and known route and the slope of the various sections of the route.

7. The control architecture (100) according to claim 5, for the optimization of the system (10) in the event that the vehicle travels on a repetitive, programmed and known route, wherein the electronic control unit (200) comprises a second self-learning module (280) configured to acquire further available information (140), learn typical speeds on mission sections and transmit them to the first self-learning module (220).

8. The control architecture (100) according to claim 7, wherein the additional available information comprises a fourth type of information (140) in turn comprising scheduled mission stops.

* * * * *